United States Patent
Kalke

(10) Patent No.: US 8,335,358 B2
(45) Date of Patent: Dec. 18, 2012

(54) METHOD AND SYSTEM FOR RECONSTRUCTING A MEDICAL IMAGE OF AN OBJECT

(75) Inventor: Martti Kalke, Tuusula (FI)

(73) Assignee: PaloDex Group Oy (FI)

( * ) Notice: Subject to any disclaimer, the term of this patent is extended or adjusted under 35 U.S.C. 154(b) by 964 days.

(21) Appl. No.: 11/729,701

(22) Filed: Mar. 29, 2007

(65) Prior Publication Data

US 2008/0240525 A1    Oct. 2, 2008

(51) Int. Cl.
*G06K 9/00* (2006.01)
*A61B 6/00* (2006.01)
*A61B 5/05* (2006.01)

(52) U.S. Cl. .............. 382/128; 378/4; 600/407

(58) Field of Classification Search .......... 382/128–132; 378/4, 901; 600/407
See application file for complete search history.

(56) References Cited

U.S. PATENT DOCUMENTS

| | | | |
|---|---|---|---|
| 2002/0044698 A1* | 4/2002 | Puetter et al. | 382/265 |
| 2002/0071140 A1* | 6/2002 | Suzuki et al. | 358/455 |
| 2003/0144585 A1* | 7/2003 | Kaufman et al. | 600/407 |
| 2006/0002635 A1* | 1/2006 | Nestares et al. | 382/299 |
| 2006/0104406 A1* | 5/2006 | Siltanen et al. | 378/4 |
| 2009/0310746 A1* | 12/2009 | Ye et al. | 378/62 |

FOREIGN PATENT DOCUMENTS

WO    WO 2004/019782 A1    3/2004

* cited by examiner

*Primary Examiner* — Vu Le
*Assistant Examiner* — Amara Abdi
(74) *Attorney, Agent, or Firm* — Andrus, Sceales, Starke & Sawall, LLP

(57) ABSTRACT

A method for reconstructing a medical image of an object in a reconstruction process, where image data is achieved by a medical imaging system by collecting a real measured projection image data of said object, in which method an antipriori component is deter-mined for modelling artifacts caused by the imaging system and/or reconstruction method. The antipriori component is used for attenuating said artifacts from the medical image of said object to be reconstructed in said reconstruction process.

21 Claims, 3 Drawing Sheets
(1 of 3 Drawing Sheet(s) Filed in Color)

METHOD AND SYSTEM FOR RECONSTRUCTING A MEDICAL IMAGE OF AN OBJECT

TECHNICAL FIELD OF THE INVENTION

The invention relates to method and system for reconstructing a medical image of an object, and also for attenuating artifacts in a medical image reconstruction and especially when reconstructing a medical X-ray image. The method is suitable also for reconstructing a medical X-ray image from sparse data.

BACKGROUND OF THE INVENTION

Three-dimensional X-ray imaging is based on taking several 1-D or 2-D projection images of a 3-D body from different directions. If 1-D projection images are available from all around a 2-D slice of the body with dense angular sampling, the inner structure of the slice can be determined. This is known as Computerized Tomography (CT) imaging technology, which is widely used in medical imagine today. A crucial part of CT technology is the reconstruction algorithm taking the X-ray images and producing a voxel representation of the 3-D body.

In the current commercial X-ray based 3D medical systems, such as CT, the attenuation of X-rays in one volume unit (voxel) inside the volume is typically defined basing on the values of the pixel values on projection images. This can be done, like in the known prior art, basing on the fact that each pixel value is an integral of attenuation along the X-ray beam in the volume. Therefore an inner structure and details of an object can be determined very accurately.

However, in many practical cases X-ray projection images are available only from a limited angle of view and therefore collecting sufficient information may be difficult. A collection of X-ray images of a 3-D body is called sparse projection data if (a) the images are taken from a limited angle of view or (b) there are only a small number of images. Sparse projection data does not contain sufficient information to completely describe the 3-D body.

However, some a priori information about the body is typically available without X-ray imaging, where the a priori information defines for example a shape or structure if the object to be imaged. A priori information may be achieved from previous measurements, for example, such as calculating an average of numerous measurements. Combining this information with sparse projection data enables more reliable 3-D reconstruction than is possible by using only the projection data.

There are, however, some problems when using traditional reconstruction algorithms such as filtered backprojection (FBP), Fourier reconstruction (FR) or algebraic reconstruction technique (ART), namely these do not give satisfactory reconstructions from sparse projection data. Reasons for this include requirement for dense full-angle sampling of data, difficulty to use a priori information for example non-negativity of the X-ray attenuation coefficient and poor robustness against measurement noise. For example the FBP method relies on summing up noise elements with fine sampling, leading to unnecessarily high radiation dose.

It is known a solution from the prior art (see WO 2004/019782, which is hereby incorporated into this document) for producing three-dimensional information of an object in medical X-ray imaging in which the object is modelled mathematically independently of X-ray imaging. The object is X-radiated from at least two different directions and the said X-radiation is detected to form projection data of the object. Said projection data and said mathematical modelling of the object are utilized in Bayesian inversion based on Bayes' formula $$p(x|m) = \frac{p_{pr}(x)p(m|x)}{p(m)}$$

to produce three-dimensional information of the object, the prior distribution $p_{pr}(x)$ representing mathematical modelling of the object, x representing the object image vector, which comprises values of the X-ray attenuation coefficient inside the object, m representing projection data, the likelihood distribution $p(m|x)$ representing the X-radiation attenuation model between the object image vector x and projection data m, $p(m)$ being a normalization constant and the posteriori distribution $p(x|m)$ representing the three-dimensional information of the object.

The solution described above is based on that biological issues have that kind of statistical a priori information that this information can be utilized successfully with Bayesian inversion in medical x-ray imaging. The suitable a priori information makes possible to model the biological tissue mathematically accurately enough and independently of X-ray imaging. From biological tissue it is possible to compile qualitative structural information, which makes it possible to utilize the Bayesian method successfully to solve the problems in medical three-dimensional x-ray imaging. There are certain regularities in biological tissues and this regularity is useful especially with the Bayesian method.

In generally one can say that iterative reconstruction methods are based on minimizing penalty functions, where two independent components are used, namely likelihood and a priory components, where the aim of the likelihood component is to minimize errors occurring when projection image determined from the reconstructed volume of the object is compared to the actual projection images of the same kind of object and volume, and where the aim of the a priory component is to minimize errors between the projection image determined from the reconstructed volume of the object and the mathematical model modelling the tissue of said volume of the object to be determined.

However, there are some problems with the prior art solutions, such as with the Bayesian method described above, namely they are not, as such, able to minimize or eliminate artifacts and especially artifacts occurring in parallel with the X-rays used in imaging process. Moreover, in some cases (such as in total variation) prior art Bayesian method even emphasizes or strengthens the artifacts in the direction of used X-rays, whereupon the quality of the reconstructed images is poor.

SUMMARY OF THE INVENTION

The object of the invention is to overcome the problems relating to the prior art solutions described above. Especially the object of the invention is to reconstruct a medical image of an object, and attenuate artifacts in the direction of used X-rays and in particularly artifacts caused by the used reconstruction algorithm, imaging conditions, and imaging geometry tolerances originating from limited angle X-ray imaging for example, where the incompleteness of the imaging geometry generates low frequency artifacts in components, which are parallel to the x-ray beam.

The object of the invention is fulfilled by reconstructing a medical image of an object in a reconstruction process, where image data is achieved by a medical imaging system by collecting a real measured projection image data of said object, in which method an antipriori component is determined for modelling artifacts caused by the imaging system and/or reconstruction method, and where said antipriori component is used for attenuating said artifacts from the medical image of said object to be reconstructed in said reconstruction process.

Furthermore the invention can be applied e.g. by introducing said antipriori component in addition to the likelihood and/or a priori components, which is priory information depending for example of the likelihood calculation behaviour. In an embodiment of the invention the antipriori component, which describes a reconstruction artifact determined from the imaging geometry and algorithm, is minimized, whereupon a total penalty function to be minimized consists of three independent components, where the first depends only on an imaging geometry, the second one on a tissue to be imaged and the third one on the imaging geometry and algorithm itself.

The invention, and especially the antipriori component, is based on that it is known beforehand what kind of errors or artifacts the other component or feature (such as used imaging system and/or reconstruction method) produces and/or induced by the likelihood component, such as for example a dot imaged and handled with the likelihood component resembles more or less a line or if numbers of images has been taken the dot is typically projected as numbers of lines, whereupon the antipriori component depending of the likelihood calculation behavior is used according to the invention to penalty the occurred artifacts, which are now lines.

Artifacts mean in this document a visible defect in a digital image.

The invention relates to a method of reconstructing a medical image of an object according to a method claim 1.

The invention relates also to a system for reconstructing a medical image of an object in medical imaging according to a system claim 11.

The invention further relates to a medical device for reconstructing a medical image of an object in medical imaging according to a medical device claim 19.

In addition the invention relates to a computer program product for reconstructing a medical image of an object according to a computer program product claim 20.

The most advantageous embodiment of the invention is described in independent claims. Further exemplary embodiments of the invention are disclosed in more details next.

In an exemplary embodiment of the invention inversion algorithms are used to create a new type of 3-D medical X-ray imaging. It is intermediate between a projection radiograph and a full computed tomography scan. Two steps are needed to perform successfully such imaging: In step one, (a) all the prior information of the tissue of interest is collected, and (b) the minimum number of radiographs containing the desired 3D information is taken. In step two, a tomographic algorithm based on said inversion algorithms is used for 3D reconstruction. The algorithm contains now two separate mathematical models.

First, all a priori information (i.e. information that is independent of X-ray imaging) is used to model the unknown object mathematically. The model is put into the form of prior distribution. Second, the measurement is modelled mathematically. This involves the geometry of the imaging device, position of the detector and X-ray source during the exposure of each projection image and a model for X-ray attenuation inside tissue. The mathematical model of the measurement is put into the form of likelihood distribution. In addition, antipriori information depending on the likelihood calculation behaviour and attenuating artifacts caused by the reconstruction algorithm, and imaging geometry, is determined in order to achieve a reconstructed medical image of the object to be imaged.

In more details, the real projection image data is collected by a measurement and is represented here by m. First guess $x_0$ for the image vector is made, after which a first virtual measurement $m_1'=Ax_0$ is performed, where the matrix A comes from the pencil beam model for the X-ray attenuation. Next an error $\epsilon_1$ for the first virtual measurement is determined as $\epsilon_1=m_1'-m$, after which a new guess $x_1=x_0-\lambda\epsilon_1$ is generated, where $\lambda$ is a relaxation parameter. A new virtual measurement $m_2'=Ax_1$ is performed next, as well as a new error $\epsilon_2=m_2-m$. This is continued until certain exit criteria (like L2-norm of the difference) are fulfilled. The exit criteria are advantageously specified beforehand. After all, the problem is culminated with minimizing a penalty function so that the exit criteria are fulfilled.

Therefore the overall reconstructed object image vector according to an exemplary embodiment of the present invention is:

$$x_{i+1} = x_i - \underbrace{(\lambda A^T \overline{(Ax_i - m)}}_{likelihood} - \underbrace{\alpha \pi_{a\ priori})}_{a\ priori} - \underbrace{\beta \pi_{antipriori}}_{antipriori},$$

which components, and especially features of the antipriori component, are described elsewhere in this document.

The present invention offers remarkable advantages over the known prior art solutions. Antipriori is priory information, which depends for example of the likelihood calculation behaviour. Therefore, unlike in basic Bayesian based statistical inversion, where a priory is totally isolated form the physical imaging, aritipriori tries to attenuate the artifacts caused by the reconstruction algorithm, imaging geometry tolerances, etc. This method can be used for example in limited angle X-ray imaging, where the incompleteness of the imaging geometry generates low frequency artifacts in components, which are parallel to the x-ray beam. Overall, this method can be used in all ill-posed imaging systems as well. Furthermore according to the invention antipriori can be applied in real time (in the fly) in a reconstruction process so that when image data is gathered it is applied by antipriori directly. This is clear advantage over the known solutions, because there is no need to store image data at first or reconstruct the medical image first and only then use antipriori.

In addition the present invention offers additional advantages, such as low cost and convenient usage, high resolution of the projection images, possibility to take as few radiographs as is needed to capture the relevant 3D information, minimizing radiation dose to the patient, and the possibility to choose imaging directions so that the X-rays do not pass through the whole head, for example, but only the interesting tissue, and thus further reducing dose.

The exemplary embodiments of the invention presented in this document are not to be interpreted to pose limitations to the applicability of the appended claims. The verb "to comprise" is used in this patent document as an open limitation that does not exclude the existence of also unrecited features. The features recited in depending claims are mutually freely combinable unless otherwise explicitly stated.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Next the invention will be described in greater detail with reference to exemplary embodiments in accordance with the accompanying drawings, in which.

One of the basic idea of the invention is kept to reconstruct a medical image of an object in a reconstruction process, where image data is achieved by a medical imaging system by collecting a real measured projection image data of said object, in which method an antipriori component is determined for modelling artifacts caused by the imaging system and/or reconstruction method, and where said antipriori component is used for attenuating said artifacts from the medical image of said object to be reconstructed in said reconstruction process.

DETAILED DESCRIPTION

Figure 1:
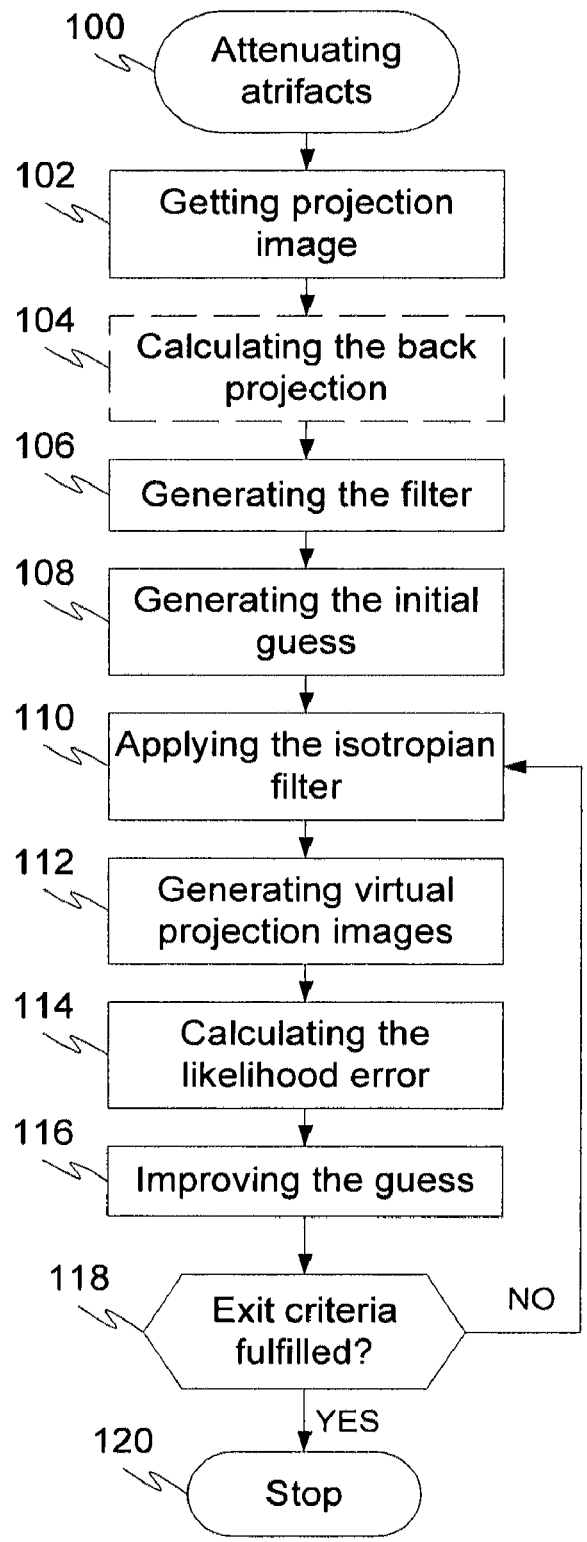
FIG. 1 illustrates a flow chart of an exemplary method for attenuating artifacts in a medical image reconstruction according to an advantageous embodiment of the invention.

FIG. 1 illustrates a flow chart of an exemplary method 100 for attenuating artifacts, or antipriori calculation, in a reconstructing process of a medical image of an object according to an advantageous embodiment of the invention. In an embodiment the mathematical fact that the sum of Fourier components in frequency domain equals to Fourier components of the sum in spatial domain is used. Moreover, it is assumed that the frequency spectrum is more or less isotropic. However, it should be clearly understood that this method does not expect that the object itself is an isotropic object, instead of that, the method prefers objects, whose spectrum is more isotropic.

At first in the antipriori method (of which an example is hereby described with steps 102-120) a real projection image data m is collected at step 102 for example by X-ray imaging an object, after which the measurement is backprojected at step 104. The backprojection is however optional and especially if antipriori is applied in the fly, backprojection is not done. The backprojection can be done for example using 50 degree aperture with one degree interval of "exposures". Due to the nature of the backprojection operation, and also of the likelihood component, some artifacts would appear in the reconstructed images. Additionally, due to the random nature of X-ray radiation, there is an inherent noise in the data that tends to make the reconstructed images rough. In order to account for both of these effects, it is necessary to filter the data, and an isotropic filter is developed at step 106, which will be applied in the iteration procedure.

After developing the filter an initial guess $x_0$ of the object (here it is an one-matrix) is generated at step 108, after which the iteration process itself is started by applying first the high-pass-filter at step 110 and then calculating the virtual projection images $m_1' = Ax_0$ at step 112, which will be compared with the real projection images m (i.e. measurement) advantageously collected at step 102.

On the next stage at step 114 the error, especially the likelihood error $\epsilon_1 = m_1' - m$, is calculated or backprojected and based on that a new guess $x_1 = x_0 - \lambda \epsilon_1$ is generated at step 116, which will be feed back to the iteration process at the step 110 if the exit criteria are not fulfilled at step 118.

The iteration process has been continued until the exit criteria are fulfilled at step 118, whereupon the reconstructed object image vector $$x_{i+1} = x_i - \underbrace{(\lambda A^T \overline{(Ax_i - m)}}_{likelihood} - \underbrace{\alpha \pi_{a\ priori}}_{a\ priori}) - \underbrace{\beta \pi_{antipriori}}_{antipriori}$$

is achieved at step 120.

Now it is to be noted that the method described in FIG. 1 is an exemplary and more detailed method of the invention, where e.g. backprojection is done. However, the invention can also be applied without backprojecting or generating a guess, but the antipriori is directly applied to the gathered image data and the output is the constructed image of the object.

Figure 2:
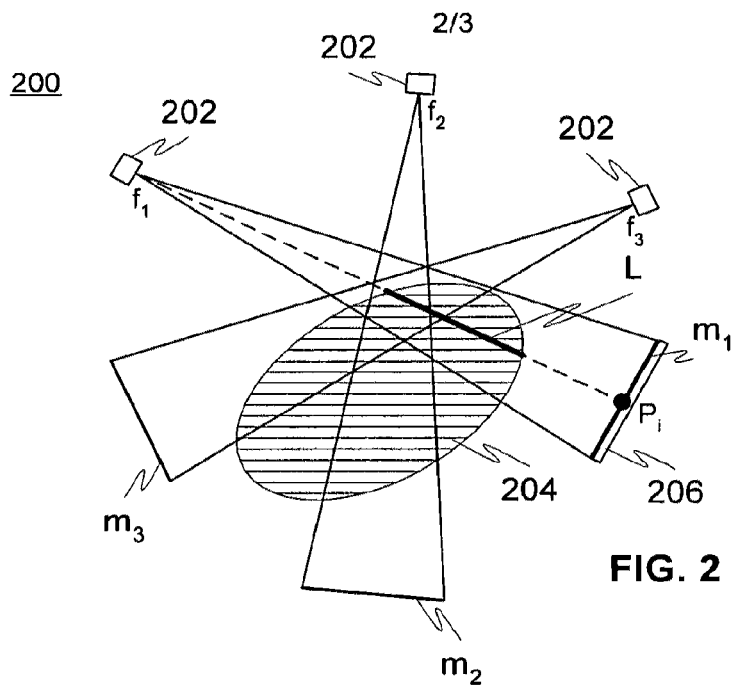
FIG. 2 illustrates a schematic measuring construction according to an advantageous embodiment of the invention.

FIG. 2 illustrates a schematic measuring construction 200 according to an advantageous embodiment of the invention, where an X-ray source 202 is placed on few places of an object 204 under imaging and where radiation passes through the object 204 and is detected by a detector 206 on the other side of the object than the X-ray source 202. In this example three different real projection image data $m_1$, $m_2$, $m_3$ are collected in three different positions $f_1$, $f_2$, $f_3$ of the X-ray source and the detector.

The X-ray source 202 is for example an X-ray source of an intra-oral X-ray source of a dentist, of a dental panoramic X-ray device, of a surgical C-arm X-ray device, of a mammography device or of any other medical X-ray device and the detector 206 is a detector of some of those devices. Usually the detector 206 is a digital sensor that can be thought of as a 2-D array of almost point like detectors.

The 3-D body 204 under imaging is modelled by non-negative X-ray attenuation coefficient. The value gives the relative intensity loss of the X-ray travelling within a small distance dr:

$$\frac{dI}{I} = x(r)dr$$

The X-radiation has initial intensity $I_0$ when entering the object 204 and a smaller intensity $I_1$ when exiting the object. The following equation shows the attenuation law:

$$\int_L x(r)dr = -\int_L \frac{I'(r)}{I(r)}dr = \log I_0 - \log I_1$$

where initial intensity $I_0$ is known by calibration, and intensity after object $I_1$ is known from the corresponding point value in a projection image. Thus the measured data is the integral of x along the line L.

In the above model it is not taken into account (a) scattering phenomena resulting in X-rays changing their direction, or (b) the dependency of attenuation on the X-ray spectrum resulting in low-energy photons being more easily attenuated than high-energy ones. Effect (b) causes errors in measurements and is sometimes referred to as beam hardening.

Figure 3:
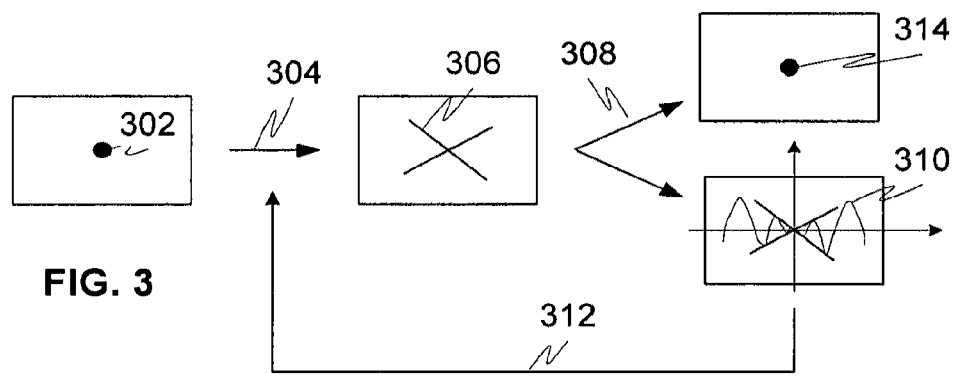
FIG. 3 illustrates an exemplary artifact induced by a likelihood component and an exemplary filtering method according to an advantageous embodiment of the invention.

FIG. 3 illustrates an exemplary artifact induced by a likelihood component and an exemplary filtering method according to an advantageous embodiment of the invention, where an object to be imaged is more or less a dot 302. Image data is collected by two different X-ray shot in step 304, whereupon (virtual measurement) image data 306 of said object is achieved. Now the likelihood or some other known component or imaging conditions creates artifacts and the dot resembles more or less like two lines (corresponding two different images collected from the object to be imaged).

Next in step 308 Fourier Transform can be performed to virtual measurement data in order to get frequency spectrum 310 of said data, to which a filtering is performed before generating a new guess with applying antipriori in step 304 (in iteration process 312) unless the exit criteria are fulfilled.

Alternatively in step 308 only antipriori is used and the reconstructed medical image from which the artifacts are attenuated by antipriori component is achieved as a result 314. The result 314 should image the authentic image of the object 302 to be imaged, if the antipriori component used in the reconstruction process was valid.

Figure 4:
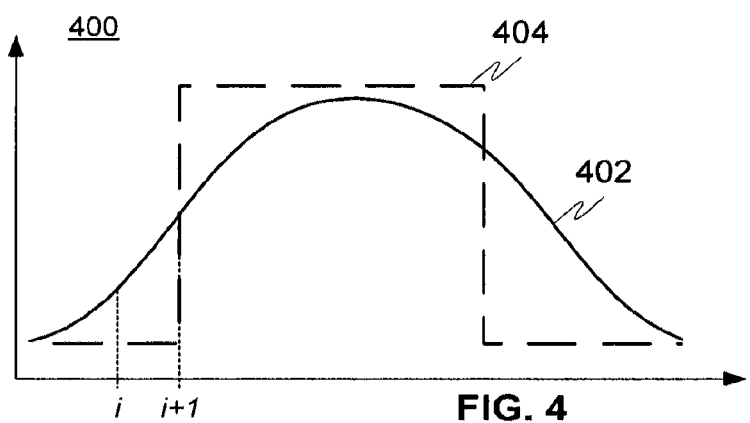
FIG. 4 illustrates another filtering method according to an advantageous embodiment of the invention.

FIG. 4 illustrates another filtering method 400 according to an advantageous embodiment of the invention, by which the virtual measurement data can be filtered. The data is advantageously filtered in order to smooth out the statistical noise, for example. There are many different filters available to filter the data and they all have slightly different characteristics. For instance, some will smooth very heavily so that there are not any sharp edges, and hence will degrade the final image resolution. Other filters will maintain a high resolution while only smoothing slightly. Some typical filters used are the Hanning filter, Butterworth filter, low pass cosine filter, Weiner filter, etc.

In the example of FIG. 4 the data 402 is handled with $(P_i-P_{i+1})^2$ component, which supports large changes and penalizes small changes and results the filtered data 404. This can be used for example when penalizing (or attenuating) artifacts described in connection with FIG. 3, such as penalizing lines in order to shaping them to the dot like.

Figure 5:
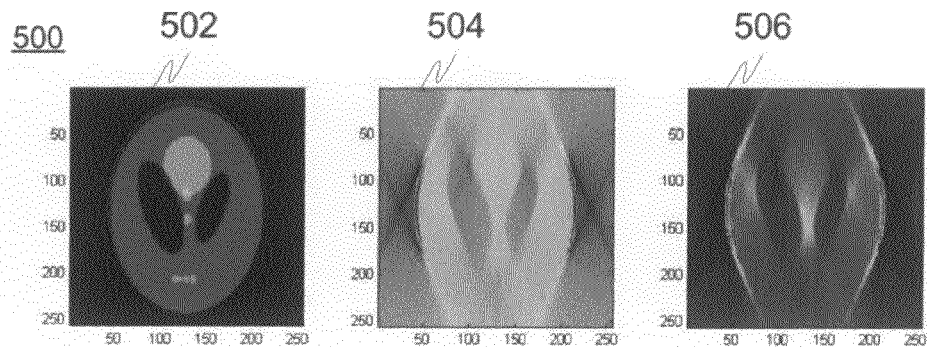
FIG. 5 illustrates an exemplary result achieved with an antipriori method according to an advantageous embodiment of the invention.

FIG. 5 illustrates an exemplary result 500 achieved with an antipriori method according to an advantageous embodiment of the invention. On the left hand side is the original object (Shepp-Logan phantom) 502. In the middle is the normal backprojection result 504 and on right hand side is the result 506 done with the antipriori method. Notice that antipriori algorithm has attenuated the off-focal shadows on the top and in the bottom part of the object. Moreover, the X-shaped artifacts on left and right side of the object have also disappeared.

Figure 6:
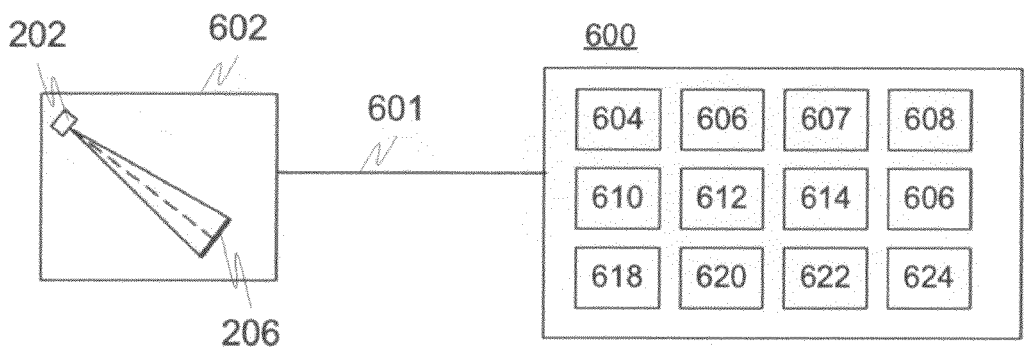
FIG. 6 illustrates a block diagram of an exemplary system for attenuating artifacts in a medical image reconstruction according to an advantageous embodiment of the invention.

FIG. 6 illustrates a block diagram of an exemplary system 600 for attenuating artifacts in a medical image reconstruction of an object to be imaged in order to get reconstructed object image vector of said object according to an advantageous embodiment of the invention, where the system either comprises or is at least in connection 601 with an imaging unit 602. The imaging unit is advantageously an X-ray imaging unit comprising an X-ray source 202 and detector 206, as known from the prior art.

The system comprises collecting means 604 for collecting a real measured projection image data of the object to be imaged, advantageously in co-operation with said imaging unit 602, and determining means 606 for determining a likelihood component and a priori component of said object image vector. In addition, the system according to the invention comprises also means 607 for minimizing an antipriori component in an iteration process when determining a final object image vector of said object.

Further, the system may also comprise according to an embodiment of the invention projecting means 608 for back-projecting said measured projection image data m, filtering means 610 for filtering said collected data, generating means 612 for generating an initial guess $x_0$ for image vector of said object, calculating means 614 for calculating at least one virtual projection image data $m_1'=Ax_0$, and comparing means 616 for comparing it with the real projection image data m, and calculating means 618 for calculating an error $\epsilon_1=m_1'-m$. In addition the system comprises also comparing means 620 for comparing said error to exit criteria. If the exit criteria are not fulfilled, the system is adapted to generate at least one new guess $x_1=x_0-\lambda\epsilon_1$ for the image vector of said object by guess generating means 612, and to calculate a new virtual projection image data $m_1'=Ax_0$ by calculating means 614, until an error between the new virtual projection image data and said the real projection image data m fulfils the exit criteria in an iteration process. Furthermore the system comprises finally reconstruction means 622 for reconstructing the object image vector of said object as:

$$x_{i+1} = x_i - \underbrace{(\lambda A^T(Ax_i - m))}_{likelihood} - \underbrace{\alpha\pi_{a\ priori}}_{a\ priori} - \underbrace{\beta\pi_{antipriori}}_{antipriori}$$

where the matrix A comes from a pencil beam model for the X-ray attenuation and $\lambda$ is a relaxation parameter.

The system may also comprise according to an embodiment of the invention means 624 for performing Fourier Transform to the virtual projection image data in order to get frequency spectrum of said data, to which the system is adapted to perform a filtering before generating a new guess with the filtering means 610, where the filtering means 610 is also adapted to develop an isotropic filter.

Figure 7:
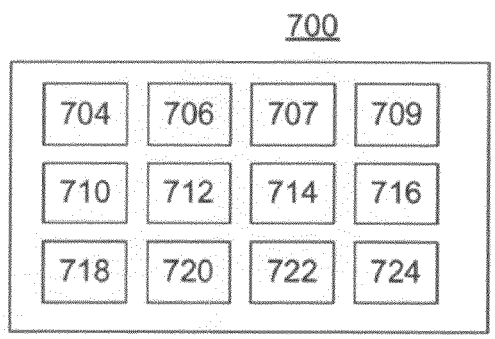
FIG. 7 illustrates a block diagram of an exemplary computer program product for attenuating artifacts in a medical image reconstruction according to an advantageous embodiment of the invention.

FIG. 7 illustrates a block diagram of an exemplary computer program product 700 for attenuating artifacts in a medical image reconstruction of an object to be imaged in order to get reconstructed object image vector of said object according to an advantageous embodiment of the invention, where the computer program product is run on a computer.

The computer program product 700 comprises according to an embodiment of the invention following means 704-724, which are advantageously implemented by software code portions, and where collecting means 704 is adapted to collect a real measured projection image data of the object to be imaged, advantageously in co-operation with said imaging unit 602 of the system 600, determining means 706 is adapted to determine a likelihood component and a priori component of said object image vector, minimizing means 707 is adapted to minimize an antipriori component in an iteration process when determining a final object image vector of said object, when said computer program product is run on the computer.

Further, projecting means 708 may be adapted according to an embodiment of the invention to backproject said measured projection image data m, filtering means 710 is adapted to filter said collected data, generating means 712 is adapted to generate an initial guess $x_0$ for image vector of said object, calculating means 714 is adapted to calculate at least one virtual projection image data $m_1'=Ax_0$, and comparing means 716 is adapted to compare it with the real projection image data m, calculating means 718 is adapted to calculate an error $\epsilon_1=m_1'-m$, and comparing means 720 is adapted to compare said error to exit criteria, when said computer program product is run on the computer.

If the exit criteria are not fulfilled, the computer program product is adapted to generate at least one new guess $x_1=x_0-\lambda\epsilon_1$ for the image vector of said object by guess generating means 712, and to calculate a new virtual projection image data $m_1'=Ax_0$ by calculating means 714, until an error between the new virtual projection image data and said the real projection image data m fulfils the exit criteria in an iteration process, and when said computer program product is run on the computer. Furthermore the computer program product comprises finally reconstruction means 722 for reconstructing the object image vector of said object as:

$$x_{i+1} = x_i - \underbrace{(\lambda A^T(Ax_i - m)}_{likelihood} - \underbrace{\alpha \pi_{a\ priori}}_{a\ priori}) - \underbrace{\beta \pi_{antipriori}}_{antipriori}$$

where the matrix A comes from a pencil beam model for the X-ray attenuation and $\lambda$ is a relaxation parameter, when said computer program product is run on a computer.

The computer program product may also comprise according to an embodiment of the invention means 724 for performing Fourier Transform to the virtual projection image data in order to get frequency spectrum of said data, to which the computer program product is adapted to perform a filtering before generating a new guess with the filtering means 710, where the filtering means 710 is also adapted to develop an isotropic filter, when said computer program product is run on the computer.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims. Also non-iterative method can be used for achieving the results of the invention.

The invention claimed is:

1. A method for reconstructing a medical image of an object in a reconstruction process, comprising:
    collecting a real measured projection image data of said object with a medical imaging system;
    comparing a reconstructed projection image data to the real measured image data for determining a likelihood component;
    determining, in addition to the likelihood component, an antipriori component for modeling artifacts caused by detects in images caused by unidealities of the imaging system geometry tolerances or algorithm; and
    using said antipriori component for attenuating said artifacts from the collected real measured image data of said object to be reconstructed in real time in said reconstruction process; wherein the antipriori component is used for attenuating artifacts induced essentially by likelihood component.

2. A method according to claim 1, wherein a priori component is also used.

3. A method according to claim 1, wherein the method is iterative method.

4. A method according to claim 1, wherein Fourier Transform is performed to image data in order to get frequency spectrum of said data.

5. A method according to claim 4, wherein the sum of Fourier components in frequency domain equals to Fourier components of the sum in spatial domain.

6. A method according to claim 4, wherein frequency spectrum is essentially isotropic.

7. A method according to claim 4, wherein the method prefers objects, whose frequency spectrum is essentially isotropic.

8. A method according to claim 4, wherein an isotropic filter is developed and applied in the iteration procedure.

9. A method according to claim 1, wherein the antipriori component is used for attenuating artifacts caused essentially by likelihood component.

10. A method according to claim 1, wherein the antipriori component is used in connection with Bayesian method.

11. A system for reconstructing a medical image of an object in a reconstruction process, the system comprising:
    a medical imaging system that achieves image data by collecting a real measured projection image data of said object, compares a reconstructed projection image data to the real measured projection image data for determining a likelihood component, determines in addition to the likelihood component an antipriori component for modeling artifacts caused by defects in images caused by unidealities of the imaging system geometry tolerances or algorithm, and uses said antipriori component for attenuating said artifacts from the collected real measured image data of said object to be reconstructed in real time in said reconstruction process; wherein the antipriori component is used for attenuating artifacts induced essentially by likelihood component.

12. A system according to claim 11, wherein the system is configured to use also a priori component.

13. A system according to claim 11, wherein the system is configured to perform Fourier Transform to image data in order to get frequency spectrum of said data.

14. A system according to claim 13, wherein the sum of Fourier components in frequency domain equals to Fourier components of the sum in spatial domain.

15. A system according to claim 13, wherein frequency spectrum is essentially isotropic.

16. A system according to claim 13, wherein the system is configured to develop an isotropic filter and apply it in the iteration procedure.

17. A system according to claim 11, wherein the system is configured to use the antipriori component for attenuating artifacts caused essentially by likelihood component.

18. A system according to claim 11, wherein the system is configured to use the antipriori component in connection with Bayesian method.

19. A medical device for reconstructing a medical image of an object in a reconstruction process, wherein the device is configured to achieve image data by collecting a real measured projection image data of said object, to compare a reconstructed projection image data to the real measured projection image data for determining a likelihood component, to determine in addition to the likelihood component an antipriori component for modeling artifacts caused by detects in images caused by unidealities of the imaging system geometry tolerances or algorithm, and to use said antipriori component for attenuating said artifacts from the collected real measured image data of said object to be reconstructed in said reconstruction process; wherein the antipriori component is used for attenuating artifacts induced essentially by likelihood component.

20. A computer program product for reconstructing a Medical image of an object in a reconstruction process, wherein the computer program product is stored on a non-transitory computer readable medium and when the computer program is run on a computer, causes the computer to:

achieve image data by collecting a real measured projection image data of said object;

compare a reconstructed projection image to the real measured projection image for determining a likelihood component;

determine in addition to the likelihood component an antipriori component for modeling artifacts caused by defects in images caused by unidealities of the imaging system geometry tolerances or algorithm; and use said antipriori component for attenuating said artifacts from the medical image data of said object to be reconstructed in real time in said reconstruction process, wherein the antipriori component is used for attenuating artifacts induced essentially by likelihood component.

21. A computer program product of claim 20, wherein the computer program product is directly loadable into the internal memory of a digital data processing device.

* * * * *